United States Patent [19]
Otani

[11] Patent Number: 5,859,590
[45] Date of Patent: Jan. 12, 1999

[54] ABNORMALITY DETECTION APPARATUS AND ABNORMALITY DETECTION METHOD

[75] Inventor: Hiroshi Otani, Tokyo, Japan

[73] Assignee: Mitsubishi Denki Kabushiki Kaisha, Japan

[21] Appl. No.: 913,629

[22] PCT Filed: May 8, 1996

[86] PCT No.: PCT/JP96/01217

§ 371 Date: Sep. 19, 1997

§ 102(e) Date: Sep. 19, 1997

[87] PCT Pub. No.: WO97/42512

PCT Pub. Date: Nov. 13, 1997

[51] Int. Cl.[6] .................................................... G08B 21/00
[52] U.S. Cl. ...................... 340/635; 340/540; 340/657; 324/520
[58] Field of Search ................................ 340/635, 540, 340/657, 659; 324/520, 521, 536, 544, 545, 546, 547, 551; 361/113, 115

[56] References Cited

U.S. PATENT DOCUMENTS

| | | | |
|---|---|---|---|
| 4,547,727 | 10/1985 | Tsui et al. | 324/76.47 |
| 5,726,576 | 3/1998 | Miyata et al. | 324/536 |

FOREIGN PATENT DOCUMENTS

| | | |
|---|---|---|
| 53-12071 | 4/1978 | Japan . |
| 58-16572 | 1/1983 | Japan . |
| 59-73776 | 4/1984 | Japan . |
| 60-242347 | 12/1985 | Japan . |
| 63-247674 | 10/1988 | Japan . |
| 3-139110 | 6/1991 | Japan . |
| 4-313074 | 11/1992 | Japan . |
| 6-230066 | 8/1994 | Japan . |

*Primary Examiner*—Daniel J. Wu
*Attorney, Agent, or Firm*—Rothwell, Figg, Ernst & Kurz, p.c.

[57] ABSTRACT

A fault sensor device comprising a receiver (3; 3A; 3B) for receiving microwaves (2, 8) radiated from an object to be monitored (1; 1A; 1B; 1C; 1D; 1E; 1F), a detector (4) connected to the receiver (3; 3A; 3B) for converting and outputting the microwaves (2, 8) into a video signal (2S4; 2S21), and a signal processor (5) for converting the video signal (2S4, 2S21) output by the detector (4) into a presentation signal (2S5) and outputting the presentation signal (2S5) to an external presentation device (91; 91A), and for determining whether or not the microwaves (2, 8) received are associated with a fault, based on one of the duration and the frequency of the video signal (2S4; 2S21) and the level of the video signal, and for issuing an alarm signal (2S6) when the determination reveals that the microwaves are associated with the fault.

14 Claims, 12 Drawing Sheets

ABNORMALITY DETECTION APPARATUS AND ABNORMALITY DETECTION METHOD

TECHNICAL FIELD

The present invention relates to a fault sensor device and a fault sensing method, and more particularly, to the fault sensor device and the fault sensing method for sensing a fault such as a dielectric breakdown or a malfunction in electrical equipment.

BACKGROUND ART

FIG. 16 is a layout view showing the layout of a known protective relay for detecting an internal fault in an oil-filled transformer having a built-in on-load tap changer. Shown here are a transformer body 30, a radiator 31 mounted on the transformer body 30 for cooling oil, and an oil pump 32 mounted in the oil pipe running between the transformer body 30 and the radiator 31. Also shown are an oil purifier 33, a tap changer chamber 34, and conservators 35 and 36. Also shown are a Buchholtz's relay 37, a sudden pressure relay 38, and an oil flow relay 39. FIGS. 17 and 18 are diagrammatic cross-sectional views showing respectively the internal constructions of the Buchholtz's relay 37 and the sudden pressure relay 38 in FIG. 16. Since the oil flow relay 39 is identical, in construction and principle, to the Buchholtz's relay 37 its explanation is omitted here.

As shown in FIG. 17, a float 37a is provided within the Buchholtz's relay 37, and the float 37a floats or submerges with a floating support 37b depending on whether oil flow 201 is a rapid or slow. When the float 37a is submerged by a rapid oil flow, its associated contact points (contactors) 37c are closed, sending a signal externally via signal lines 37d.

As shown in FIG. 18, a partitioning plate 38a is provided in the middle of the sudden pressure relay 38, and the upper space above the. partitioning plate 38a forms a switch chamber 38b, in which a microswitch 38c is mounted. The partitioning plate 38a is provided with a hole in its center in which a bellows 38d is firmly engaged as shown, so that oil may not ingress into the switch chamber 38b. The partitioning plate 38a is provided with an equalizing capillary 38e which comunicates the switch chamber 38b with the interior of the bellows 38d to equalize both internal pressures. Disposed above the bellows 38d is a microswitch driving bellows 38f which expands upward by means of oil pressure 202 to activate the microswitch 38c when an oil pressure sudden or the like is generated.

The operation will now be discussed. When a fault associated with arcing takes place within the transformer body 30, the surrounding dielectric materials are quickly decomposed thermally and gasified, causing a rapid oil flow toward the conservator 36 and a sudden internal pressure rise. When the rapid oil flow takes place, the float 37a in the Buchholtz's relay 37 is forced to be submerged as shown in FIG. 17 by the dashed line, closing the associated contact points (contactors) 37c, whereby a signal is generated externally via the signal lines 37d. In the sudden pressure relay 38, the microswitch driving bellows 38f is expanded in response to the sudden oil pressure rise, whereby a contact closure signal for microswitch 38c is generated externally.

On the other hand, during normal operation, although a mild thermal expansion of oil takes place in the transformer body 30 as ambient temperature rises or a load increases, the resulting slow oil flow does not force the float 37a of the Buchholtz's relay 37 to submerge, and in the sudden pressure relay 38, the mild pressure change is equalized through the equalizing capillary 38e mounted between the bellows 38d and the switch chamber 38b, whereby the microswitch driving bellows 38f is not expanded upward, and a contact closure signal of the microswitch 38c is never generated.

Since the known protective relays in FIG. 16 are constructed as mentioned above, and the fault in the transformer body 30 is detected by the Buchholtz's relay 37 and the sudden pressure relay 38, the known protective relays suffer from the problem that when a sudden oil flow or a sudden pressure change takes place where the the oil pump 32 is started or stopped or in the event of an earthquake, the known protective relays arise malfunction by mistaking the change for a fault. There is also a considerable time lag from the moment an arc occurs to the moment of thermal decomposition of the dielectric and pressure rise. Furthermore, the mechanical relays mentioned above take time to operate, so a considerable time delay is involved until the transformer body 30 is stopped by the relay signals, whereby the fault area is widened in terms of mean time.

FIG. 19 shows the construction of a known differential relay used for detecting an internal shortcircuit fault in a transformer. In the figure, CT1 and CT2 denote current transformers respectively arranged on the primary side 40 and the secondary side 41 of the transformer, and the secondary windings of the current transformers CT1 and CT2 are connected to the operating coil of the differential relay 43 in a manner so that both transformers conduct current in mutually opposite directions. Current transformation ratios are determined based on the transformation ratio of the transformer so that the secondary currents of the current transformers CT1 and CT2 are approximately equal to each other.

The operation will now be discussed. When the transformer (40, 41) is operating normally, the secondary currents of the current transformers CT1 and CT2 are almost equal to each other, and a current (i1−i2) in the operating coil of the differential relay 43 is too small to activate the differential relay 43. However, when an accident such as shorted layer, grounding or the like takes place in the transformer 40, 41, the ratio of the primary current (I1) to the secondary current (I2) of the transformer becomes different from rated ratio, thereby increasing the current (i1−i2) in the operating coil, activating the differential relay 43, to thereby output the signal.

However the transformer 40, 41 is typically provided with a tap changer 44 and taps 45, thus the current (i1−i2) in the operating coil cannot always be zero when the transformer 40, 41 is operating normally. For this reason, some degree of dead zone should be allowed in the relay itself so that the differential relay 43 may not be activated by the current (i1−i2) in the operating coil during normal operation. Due to the dead zone, the known differential relays suffer from the problem that an initial minor layer short fault goes undetected, and the fault is detected later at its advanced stage in which a substantial number of windings are shorted.

FIG. 20 is a block diagram showing the construction of an internal fault sensor device of electrical equipment disclosed in Japanese Laid-open Patent Publication No. 63-247674. Shown in the figure are a switchgear 51 as an object to be monitored, and an electromagnetic wave signal 52, which is generated by an internal fault in the switchgear 51, and which has a diversity of frequency components determined by the circuit configuration and the length of line on which the switchgear 51 is placed. Designated 53A and 53B are a pair of loop antennas covering the medium frequency to very high frequency wave bands, which are spaced apart by 1 m or so with the planes of the loops mutually in parallel and at a right angle to a line which connects both loop antennas. The output of each of the loop antennas 53A and 53B is conducted to a junction connector via a coaxial cable. One loop antenna 53B is provided with a polarity changing switch 53b, so that the two loop antennas 53A and 53B can be set to the same or opposite polarities. Numeral 54 denotes a first amplifier which is either of a tuned type or non-tuned type. Also shown are a detector 55 connected to the first amplifier 54, a second amplifier 56 connected to the output side of the detector 55, a sound generator 57 connected to the output side of the second amplifier 56, and a pulse count display means 58 connected to the output side of the detector 55.

The operation will now be discussed. The electromagnetic wave signal 52 generated within the switchgear 51 is received by the antennas 53A and 53B, and fed via the coaxial cables and connectors to the first amplifier 54, where it is amplified into a first signal, and the detector 55 outputs a second signal which is the envelope of the first signal. The second signal contains extremely high frequency components and audio frequency components as well. The second signal is fed to the second amplifier 56 to be amplified there and then output as an audio sound by the sound generator 57, while the second signal is also fed to the pulse count display means 58 which counts and displays a frequency in excess of a set level. When the electromagnetic wave 52 originates in a line vertical to a line which connects the two loop antennas 53A and 53B, the output increases if both loop antennas are set to the same polarity, and the output decreases if both loop antennas are set to be opposite polarity, but as the electromagnetic source recedes from the vertical line, the difference between the same polarity and the opposite polarity is lowered. Taking advantage of this, the direction of radiation of the electromagnetic wave 52 can thus be found and the location of the fault generated detected.

The known internal fault sensor device in the electrical equipment in FIG. 20 is constructed as mentioned above accordingly, such electrical equipment suffers from problems such as noise from broadcasting waves, etc. is likely to interfere since broadcasting systems widely use frequency bands from medium wave to very high frequency wave, the operation is complex since the position and alignment of the pair of loop antennas 53A and 53B need to be changed while manipulating the polarity changing switch 53b to find the direction, the difficulty of minituarizing, handling and mounting the device since the separation dimension between the antennas 53A and 53B, is as large as 1 meter.

FIG. 21 is a schematic diagram of a known fault monitoring device used in electrical equipment as disclosed by Japanese Laid-open Patent Publication No. 7-128393. Shown in the figure are a high-voltage bus 61 as an object to be monitored, a voltage transformer 62 connected to the high-voltage bus 61, a switching element 63 connected to the secondary side of the voltage transformer 62 that responds to faults other than dielectric faults, a discharger 64 connected to the secondary side of the voltage transformer 62, in parallel with the switching element 63, an electromagnetic wave 65 generated by the discharge of the discharger 64, an antenna 66 for receiving the electromagnetic wave of a partial discharge, and a fault sensor device 67 connected to the antenna 66.

The operation will now be discussed. When a fault other than a dielectric fault takes place, the switching element 63 is opened, and the voltage into which the voltage transformer 62 divides the voltage of the high-voltage bus 61 is applied to the discharger 64, whereby the discharger 64 starts discharging. The electromagnetic wave 65 is radiated by the discharging and is received by the antenna 66. The received signal at the antenna 66 is sent to the fault sensor device 67, by which the generation of the fault is detected.

Since this known fault monitoring device for use in electrical equipment is constructed as shown in FIG. 21, the electromagnetic wave 65 must be artificially generated by the switching element 63, the voltage transformer 62 and the discharger 64 to detect faults other than partial discharges. Since the device responds to partial discharges, it is difficult to discriminate its fault from partial discharges even though they are completely different phenomenas.

FIG. 22 is a block diagram showing the construction of a known fault sensor device used in a gas insulated switchgear as disclosed by Japanese Laid-open Patent Publication No. 3-139110. Shown in the figure are a gas container 70 of the switchgear, a plurality of main circuit conductors 71 disposed in the gas container 70, and an insulating spacer 72 which passes through and supports the main circuit conductors. Numeral 73 denotes an electric-field moderating electrode embedded in the insulating spacer 72, which is connected to a mounting nut and bolt 75 via a connecting bolt 74 used as an antenna. The mounting nut and bolt 75 is insulated from the gas container 70 by an insulating washer (not shown), and is connected to the ground via a low-pass filter 76. Numeral 77 denotes a receiver for picking up electromagnetic waves of a particular frequency such as 100 MHz or so, for example, and the mounting nut and bolt 75 is connected to the input side of the receiver 77 via a coaxial cable 78. Numeral 79 denotes a signal process determining module connected to the output side of the receiver 77.

The operation will now be discussed. When a partial discharge occurs in the gas container 70, the electromagnetic wave (not shown) generated by the partial discharge is received by the electric-field moderating electrode 73 in the insulating spacer 72, and input to the receiver 77 via the connecting bolt 74 and the mounting nut and bolt 75, and is detected and judged by the signal process determining module 79.

Since the known fault sensor device for the gas insulated switchgear in FIG. 22 is thus constructed, the distance between the main circuit conductors 71 and the electric-field moderating electrode 73 is short compared with the wavelength of the electromagnetic wave to be received (the wavelength is 3 m in the gas and 1.7 m in the spacer material), the fault sensor device responds to a frequency component of the oscillation voltage of the main circuit conductors 71 that happens to be the same frequency as the response frequency of the receiver, rather than to the electromagnetic wave (radiation electric field), and furthermore, since even travelling high-frequency oscillation voltages occuring outside of the switchgear, such as coronas generated on the bus in the air connected to the switchgear are detected, the possibility of erroneous sensing a rises and noise levels cannot be reduced. Since the detection is chiefly dependent on electrostatic coupling with the main circuit conductors 71, a discharge in gas-filled space remote from the main circuit conductors 71 is difficult to detect.

As mentioned above, in the protective relays in FIG. 16, the fault sensor device suffers from the problems that the fault sensor device is activated by an internal oil flow or a change in oil pressure which is not caused by an internal fault in the electrical equipment, and that the fault area is widened since a considerable time is needed until the oil flow and pressure change increase enough and the mechanical operation of the fault sensor device itself is completed. The known differential relay used in the transformer shown in FIG. 19 suffers from the problem that a fault is detected only when the fault area is substantially widened since a dead zone is needed in consideration of the tap change. The known internal fault sensor device shown in FIG. 20 suffers from the problem that a pair of loop antennas are needed for direction finding, thus its operation is complicated involving the polarity changing step, and also its large dimensions present difficulties in handling the device. In the known fault monitoring device for use in electrical equipment in FIG. 21, a special mechanism is needed to artificially generate an electromagnetic wave in response to a fault other than dielectric faults, thus presenting the difficulty of discriminating between a partial discharge and other faults which are the different type of phenomena from the discharge. In the known fault sensor device in gas insulated switchgear shown in FIG. 22, the distance between the antenna and the main circuit conductors to which high-frequency oscillation voltages travelling from outside of the switchgear due to a diversity of causes are fed is short compared with the wavelength, the antenna is placed in the near field where the effect of electrostatic field is dominant, and thus the fault sensor device suffers from the problem that the detection of the fault is influenced by noise propagating from sources other than the subject electrical equipment, and that the level of detection for discharges or the like in the gas-filled space remote from the main circuit conductors is lowered.

DISCLOSURE OF INVENTION

The present invention has been developed to solve the above problems, and it is an object of the present invention to provide a fault sensor device which is compact, easy to operate, and free from erroneous sensing, which detects internal faults in a correct and fast manner, and which operates to respond to the internal fault before the fault area is widened.

It is another object of the present invention to provide a fault sensing method which is free from erroneous sensing and detects internal fault correctly, immediately and efficiently before the fault area is widened.

The fault sensor and method according to the present invention is characterized in that electromagnetic waves, in particular, microwaves are detected. Namely, in the present invention, noting that microwaves have the characteristics that they are reflected off the surfaces of conductors such as metal but are transmitted and propagate through vacuums, the atmosphere, and further, though gases, oil, solid insulators and the like, that they are emitted by electrical equipment and electrical circuits when they work at a predetermined step in their normal operation, or when they have a fault, that they are emitted by natural phenomena such as lightning or electrostatic discharges, and further that noise interference can be prevented by appropriately selecting bands because this emission is distributed over the entire microwave range, the fault sensor and fault sensing method adapted to a specific object can thus be obtained by detecting such microwaves.

BEST MODE FOR CARRYING OUT THE INVENTION

Figure 1:
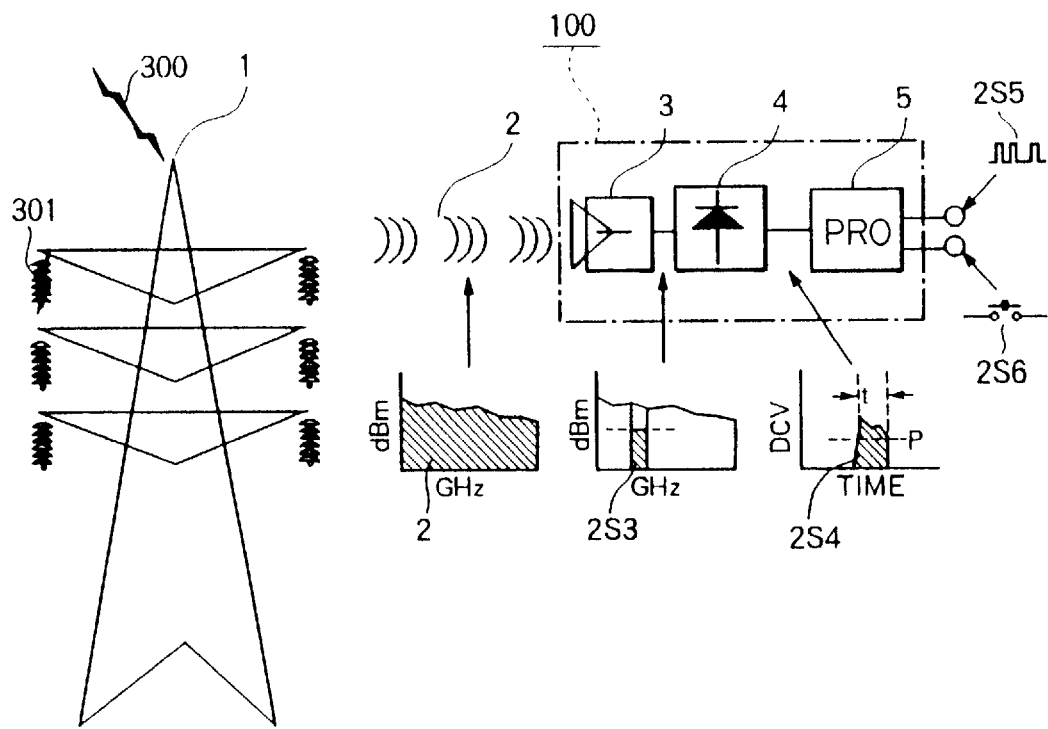
FIG. 1 is a general constructional view showing the fault sensor device in its operating state according to embodiment 1 of the present invention.

Referring to the drawings, the preferred embodiments of the present invention will now be discussed.

Embodiment 1

Figure 2:
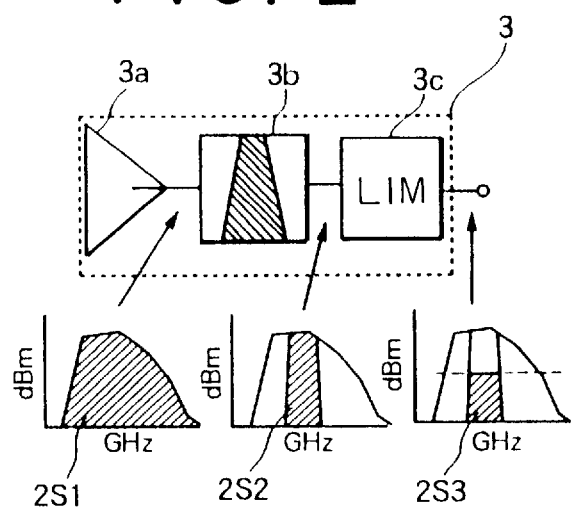
FIG. 2 is a block diagram showing the internal structure of the receiver of the fault sensor device of FIG. 1.

FIG. 1 is a general constructional view showing a fault sensor device 100 in its operating state according to embodiment 1 of the present invention, and FIG. 2 is a block diagram showing the internal structure of the receiver in the fault sensor device 100 of FIG. 1. Shown in FIG. 1 are a transmission tower 1 which is the object to be monitored, microwaves 2 radiated from a lightning strike 300 or an insulator flashover 301, a receiver 3 placed to receive part of the microwaves 2, a detector 4 connected to the receiver 3 for detecting a microwave signal 2S3, and a signal processor 5 connected to the detector 4. The fault sensor device 100 of this embodiment comprises the receiver 3, the detector 4, and the signal processor 5. The term microwave refers to electromagnetic waves of frequencies ranging from 1 GHz (wavelength of 30 cm) to 30 GHz (wavelength of 1 cm). As shown in FIG. 2, the receiver 3 comprises an antenna 3a for receiving the microwaves 2, a bandpass filter 3b connected to the output side of the antenna 3a for filtering out the components of microwaves other than a fixed frequency band, and a limiter 3c connected to the output side of the bandpass filter 3b for limiting components of the microwaves to a fixed level by clipping the components beyond the fixed level. The operation of the fault sensor device 100 of the present invention will now be discussed. As shown in FIG. 1, the arcs of a lightning strike 300 or aerial flashover 301 generated on the transmission tower 1 emit strong microwaves 2 in a wide frequency band, which are then fed to the receiver 3 in the fault sensor device 100. In the receiver 3, as shown in FIG. 2, the antenna 3a receives the microwaves (2S1 in FIG. 2) of predetermined frequency components, the bandpass filter 3b filters out components other than the fixed frequency band (2S2 in FIG. 2), and the limiter 3c outputs to the detector 4 the microwave signal (2S3 in FIG. 2) limited to the fixed level by the limiter 3c. The detector 4, as shown in the graph in FIG. 1, outputs a video signal (2S4 in FIG. 1) corresponding to the envelope of the microwave signal (2S3 in FIG. 2) coming in from the receiver 3 to the signal processor 5. The signal processor 5 outputs a presentation signal 2S5 by digitally converting the video signal from the detector 4 while the signal processor 5 determines the magnitude and duration of the video signal, and outputs an alarm signal 2S6 only when the magnitude of the video signal is equal to or higher than a predetermined value (P) and the duration of the video signal is equal to or longer than a predetermined time (t).

As described above, when an insulator flashover fault 301 is caused by a lightning strike or insulator contamination on the transmission tower 1 which is an object to be monitored, microwaves 2 are emitted from the flashover arcs, and the fault sensor device 100 converts the microwaves 2 into the presentation signal which is digitally converted by the signal processor 5 and then transferred, and at the same time, the magnitude and duration of the video signal are determined to output the alarm signal thereby preventing erroneous sensing. Also since the device operates faster than known mechanical relays, the alarm signal allows a reclosing operation or system switching operation to be performed in a fast and reliable manner.

If the fault sensor devices 100 are mounted for all transmission towers 1 along the transmission line, transmission towers 1 suffering from a lightning strike or flashover are identified on an individual basis, and later investigations and restoring operations may be performed quickly.

Since the receiver 3 comprises the antenna 3a, the bandpass filter 3b and the limiter 3c, microwaves other than of the predetermined frequency component will not be received, unwanted microwaves outside of the detection bandwidth are removed, and the signal, even within the predetermined band, is limited to a fixed value, and then fed to the detector 4. This protects the fault sensor device 100 from damage by excess radiation waves such as from lightning strikes.

Since the signal processor 5 determines the magnitude and duration of the input signal, no alarm signal is issued at all when the fault is a minor discharge, such as a corona that needs no emergency handling, or a lightning strike or flashover that immediately and spontaneously disappears needing no response.

The fault sensor device of this invention, free from erroneous sensing in this way, senses an internal fault correctly and quickly, and immediately operates to respond to the internal fault before the fault area is widened. The operation is simple, and does not require any particular operator intervention, the receiver 3 receives microwaves automatically, and the signal processor 5 outputs presentation signal or alarm signal, to eliminate the above-described operational inconveniences associated with the known examples. Furthermore, since the fault sensor device of the present invention comprises the receiver 3, the detector 4 and the signal processor 5, each made of miniature microwave components and circuits, the size of the device is reduced, and a compact design may be easily implemented.

Although the object to be monitored is the transmission tower 1 and the fault to be monitored is a lightning strike or aerial flashover in this embodiment, the present invention is not limited to these. For example, the object to be monitored may be electrical equipment or a bus, and the fault to be monitored may be an aerial flashover fault. In such a case, the same advantages are equally enjoyed. Furthermore, when the object to be monitored is pantographs for electric railcars or slip rings of rotating machines and the fault to be monitored is wear or break of slide conductors, the fault sensor device 100 of the present invention may be equally applied. Furthermore, the object to be monitored may also be a discharge lamp with the fault to be monitored being its malfunction.

Embodiment 2

Figure 3:
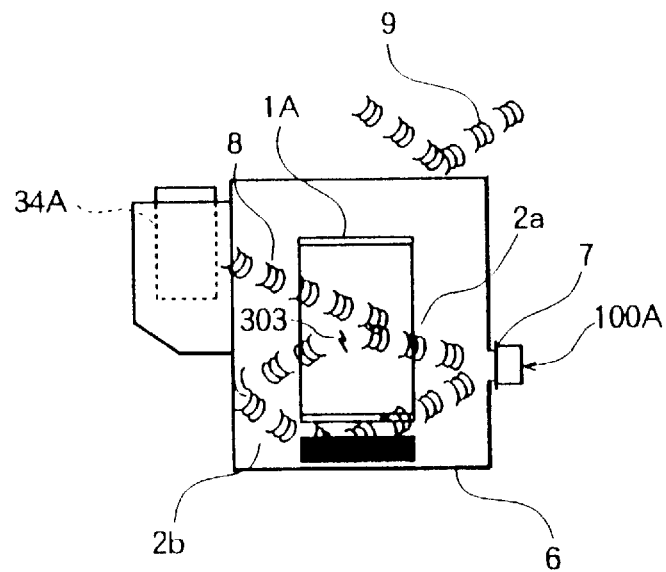
FIG. 3 is a general constructional view showing the fault sensor device in its operating state according to embodiment 2.
Figure 4:
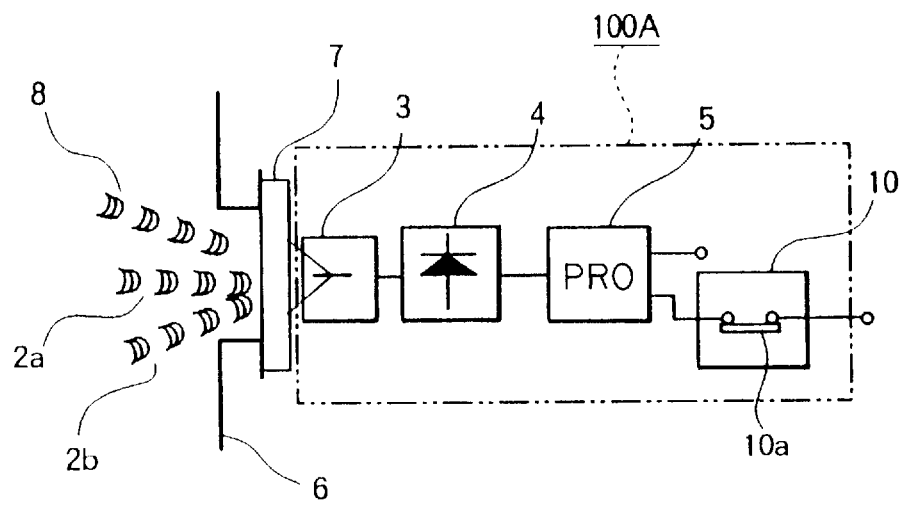
FIG. 4 is a block diagram showing the internal structure of the fault sensor device of FIG. 3.

FIG. 3 is a general constractional view showing the fault sensor device 100A in its operating state according to another embodiment of the present invention, and FIG. 4 is a block diagram showing the internal structure of the fault sensor device 100A of FIG. 3. In this embodiment, the object to be monitored is in an enclosure or container formed of metal, such as a switchboard cubicle, a gas insulated switchgear or a power transformer. The fault sensor device 100A is placed in a internal space enclosed by metal, or placed facing the opening formed in the metal enclosure as shown in FIGS. 3 and 4. In FIGS. 3 and 4, numeral 6 denotes a tank of an oil-filled transformer made of metal, and a dielectric window 7 (hereinafter referred to as an aperture) formed in the surface of the tank 6 and working as an opening that allows an electromagnetic wave to pass therethrough while maintaining an oil seal. In the oil-filled transformer having a built-in on-load tap changer (TC) 34A, 8 denotes microwaves that are generated when arcs are created or extinguished in the switch section (not shown) of the tap changer 34A in the course of tap changing operation in response to an operation command, and 9 denotes a microwave noise external to the tank 6. 1A denotes the internal structure of the transformer, and 2a and 2b are microwaves generated by the internal structure 1A of the transformer. The microwaves 2a are the ones (hereinafter direct waves) that directly arrive at the fault sensor device 100A from an internal flashover that is a radiation source, and the microwaves 2b are those (hereinafter reflected waves) that arrive at the fault sensor device 100A after being emitted from the internal flashover that is the radiation source but reflected off the inner surface of the tank 6. In FIG. 4, 10 denotes a lock circuit connected to the alarm signal output side of the signal processor 5. The lock circuit 10 contains a switch 10a, which is opened for a fixed period of time after a tap change command signal for changing the tap of the changer 34A is issued, and which is then closed automatically after the fixed period of time has elapsed. The receiver 3, the detector 4 and the signal processor 5 remain identical to those in the embodiment 1, and their explanation is omitted here.

The operation will now be discussed. In FIG. 3, the microwaves 2a and 2b radiated from arcs such as a short fault (internal flashover) 303 generated within the tank 6 comprise the direct waves 2a that directly arrive at the receiver 3, and the reflected waves 2b that propagate to the receiver 3 after being reflected several times off the surface of the metal structure such as the inner surface of the tank 6, and these are summed in power on the antenna 3a of the receiver 3, and then fed to the detector 4. On the other hand, the microwave noise 9 external to the transformer is reflected off the outer surface of the tank 6 of the transformer, and is unable to reach the receiver 3. The operation of the receiver 3, the detector 4, and the signal processor 5 remains unchanged from that of the embodiment 1, and it is thus omitted. The microwave 8 radiated in the course of the tap changing operation can cause the signal processor 5 to output an alarm signal. However, in this embodiment, the switch 10a of the lock circuit 10 is left open for the fixed period of time in response to the tap change command signal, and the alarm signal is thus prevented from issuing.

As described above, the microwaves 2a and 2b radiated from the arcs in the short fault (internal flashover) generated within the oil-filled transformer that is the object to be monitored, are collected directly or indirectly after being reflected off the inner surface of the tank 6, and summed by the receiver 3 for higher sensitivity, while the external microwave noise 9 is reflected off the outer surface of the tank 6, resulting no effect on the receiver 3. Thus, the S/N ratio (signal to noise ratio) is enhanced, and a highly reliable fault sensor can be obtained.

During one step in normal operation, namely, in the operation of the fault sensor device 100A responding to the microwaves 8 radiating from the arcs generated in the course of the operation of the on-load tap changer 34A, the lock circuit 10 opens its switch 10a in response to the tap change command signal as a start signal, and locks signal transmission for the predetermined fixed period of time (hereinafter referred to as normal operation period of the tap changer 34A), and thus erroneous operation at later stages is easily prevented. The lock circuit 10 works only during the normal operation period of the tap changer 34A, and when the arcs continue longer than the normal operation period due to switching failure, for instance, the signal of the fault sensor device is transmitted as a fault signal, allowing the alarm signal to be output.

Since the creation of arcs is detected without waiting for a secondary phenomenon (a pressure rise due to the gasification expansion of an insulating material), the operation of the protective relay is fast, and the failure in the transformer is prevented from spreading.

In this embodiment, the present invention is applied to oil-filled transformer, but it is not limited thereto. For example, the present invention may be equally applied to a gas insulated transformer. Furthermore, the present invention may be applied to a switchboard or a gas insulated switchgear, and the lock circuit 10 may be designed to prevent the issue of the alarm signal while a built-in relay or switch in the case of a switchboard or a switch electrode section in case of gas insulated switch gear performs its switching operation in response to a command.

Embodiment 3

Figure 5:
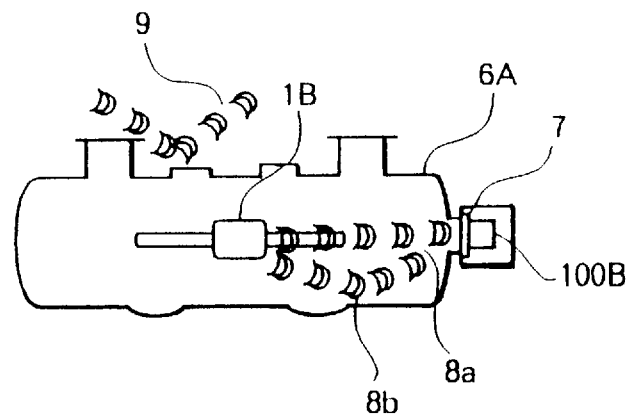
FIG. 5 is a general constructional view showing the fault sensor device in its operating state according to embodiment 3.
Figure 6:
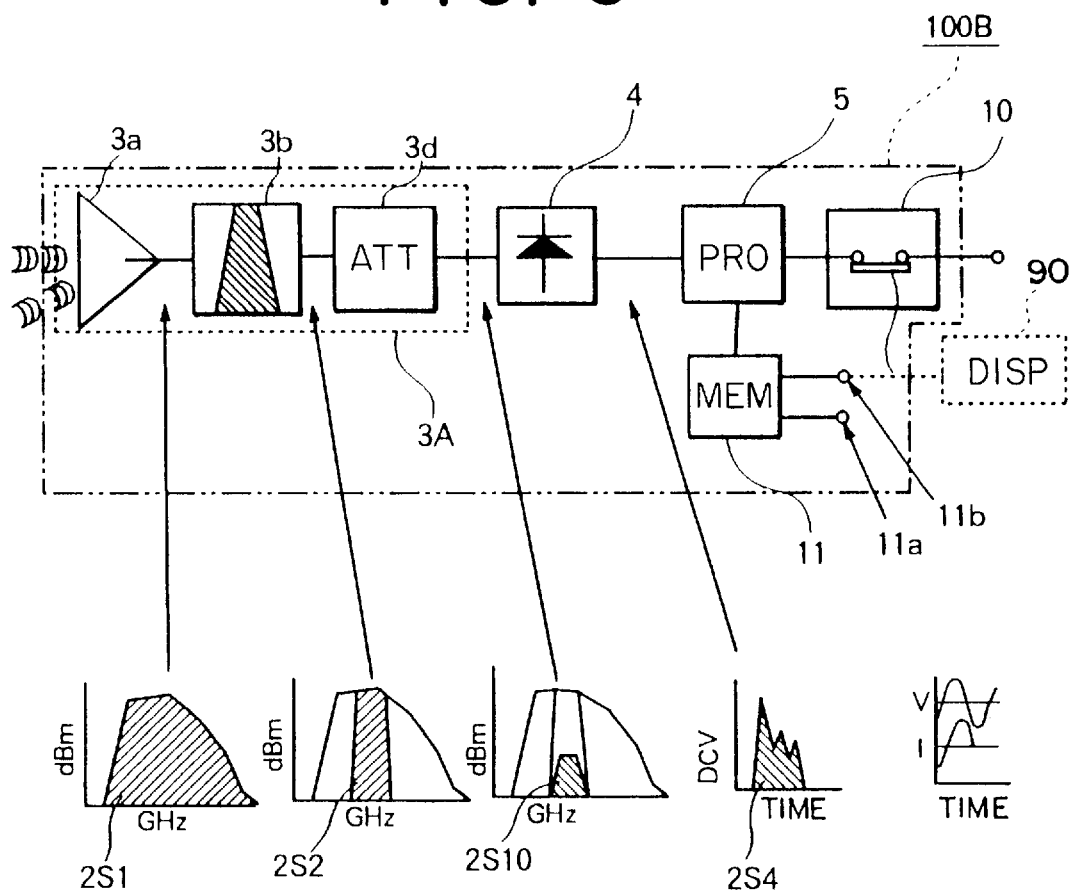
FIG. 6 is a block diagram showing the internal structure of the fault sensor device of FIG. 5.

FIG. 5 is a general constractional view showing the fault sensor device 100B in its operating state according to another embodiment of the present invention, and FIG. 6 is a block diagram showing the internal structure of the fault sensor device 100B of FIG. 5. In this embodiment, the bad condition of a switchgear is detected by observing microwaves that are emitted during the operation of the switchgear. In FIG. 5, 6A denotes the container of a gas insulated circuit breaker made of metal. 1B denites a switch electrode of the circuit breaker that is an object to be monitored, and 8a and 8b denote microwaves from the switch electrode 1B, 8a being a direct wave and 8b being a reflected wave. 7 and 9 denote items identical to those in embodiment 2, and their explanation is omitted here. In FIG. 6, the antenna 3a and the bandpass filter 3b in the receiver 3A remain identical to those in the embodiment 1, and 3d denotes an attenuator connected to the output side of the bandpass filter 3b. The function and operation of the attenuator 3d will be described later. In the same figure, 11 denotes a memory connected to the presentation signal output side of the signal prosessor 5 and provided with an input terminal 11a to which a signal is input from the outside and an output terminal 11b that outputs a presentation signal or the like to the outside. In the same figure, the detector 4 and the signal processor 5 remain identical to those in the embodiment 1, and the lock circuit 10 remains identical to that in embodiment 2.

The operation will now be discussed. In FIG. 5, as the circuit breaker operates, creation and extinction of arcs are performed on the switch electrode 1B, and in the course of the creation and extinction, microwaves are radiated, part of them becoming the direct wave 8a, and another part becoming the reflected wave 8b that is reflected off the inner surface of the circuit breaker container 6A or the like, both reaching the fault sensor device 100B mounted at an aperture 7. In FIG. 6, parts 8a and 8b of the microwave are received and combined by the antenna 3a of the receiver 3A (2S1 in FIG. 6), with unwanted frequency components filtered out by the bandpass filter 3b (2S2 in FIG. 6), and then fed to the attenuator 3d. The attenuator 3d attenuates input signal components, without changing variations on the time axis, down to a level at which the signal does not saturate the detector 4 (2S10 in FIG. 6) and then outputs the attenuated signal. The operation of the detector 4, the signal processor 5 and the lock circuit 10 remains identical to that in embodiment 1, so its explanation is omitted here. Along with the presentation signal from the signal processor 5, signals such as a circuit voltage V (refer to FIG. 6), a current I (refer to FIG. 6), and a cumulative switching cycle count are input to and stored in the memory 11. By connecting an appropriate computing and display device 90 such as a personal computer to the output terminal 11b of the memory 11 as shown in FIG. 6, data recorded at each operation of the circuit breaker may be retrieved, the variation of the microwave with time is examined in consideration of breaking current and phase, data is compared with recorded data having similar breaking conditions, and thus the bad condition of the circuit breaker is analyzed. On the other hand, the alarm signal from the signal processor 5 is output via the lock circuit 10 in this embodiment in the same way as in embodiment 2, and thus, only when the arcs continue to spread greater than the normal operation period, the alarm signal is issued in the same way as in the embodiment 2.

As described above, this embodiment enjoys the same advantage as in the above embodiments 1 and 2, and since the microwaves radiated from the electrode at each switching operation of the circuit breaker are stored along with the circuit voltage, current and the cumulative operation cycle count, the breaking phase and current values are compared with past records for technical analysis, and thus the driving timing of the driving mechanism of the circuit breaker and the condition of the switch electrode can be diagnosed. When a aborted breaking takes place in the circuit breaker, an alarm signal is quickly issued. Since the attenuator 3d of the receiver 3A attenuates the signal without altering the variation of the signal along the time axis, the variation with time can be precisely evaluated by the signal processor 5.

Although, in this embodiment, the attenuator 3d of the receiver 3A restricts the input to the detector 4, it is assumed that there may be cases where the input to the detector 4 is insufficient depending on the type or rating of the circuit breaker or on the method of mounting the fault sensor device 100B. In such cases, the attenuator 3d may be omitted from the arrangement to assure a sufficient level of input to the detector 4, and thus, whether or not the attenuator 3d should be included in the receiver 3A may be decided appropriately.

Further, in this embodiment, the fault sensor device 100B of the present invention is applied to the circuit breaker, and the present invention may naturally be applied to a load break switch or an isolator, and is further applied to monitoring the operation of the on-load tap changer of a transformer. The on-load tap changer repeatedly creates and extinguishes arcs at a plurality of contacts at each switching operation, the operation timing from one contact to another being monitored by the time intervals between emissions of the microwaves, the driving mechanism being monitored during operation, and the degree of wear of the contacts being analyzed and diagnosed by the magnitude and duration of the microwaves.

Embodiment 4

Figure 7:
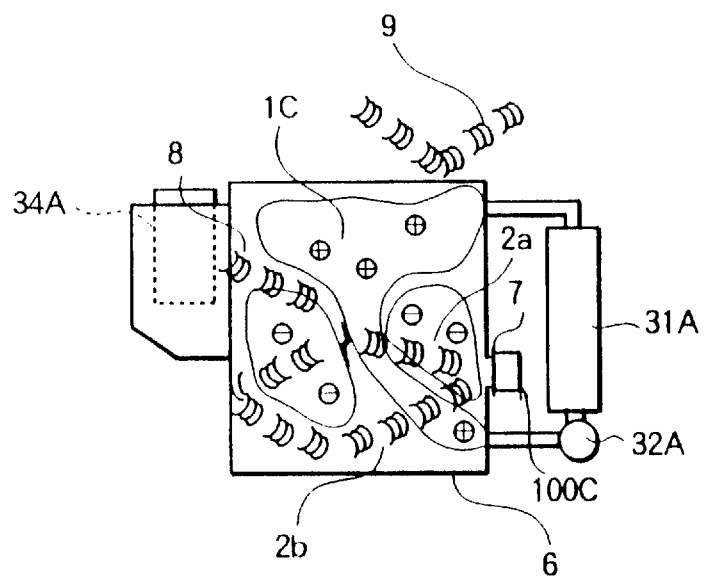
FIG. 7 is a general constructional view showing the fault sensor device in its operating state according to embodiment 4.
Figure 8:
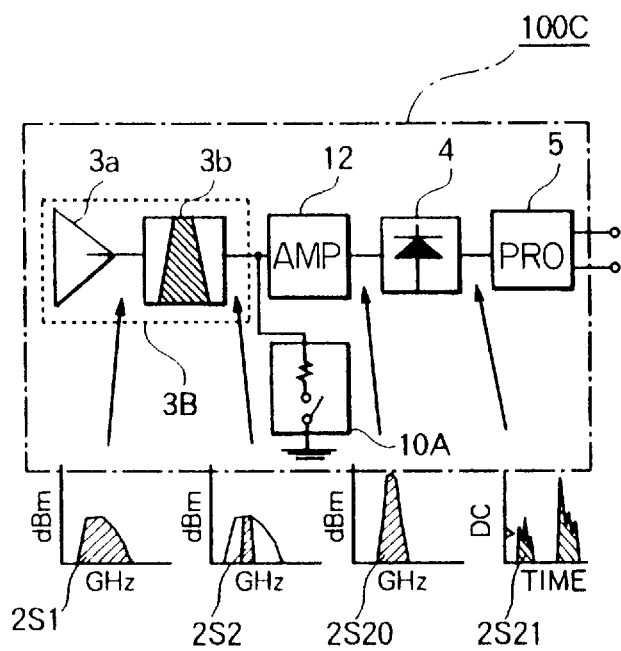
FIG. 8 is a block diagram showing the internal structure of the fault sensor device of FIG. 7.

FIG. 7 is a general constructional view showing the fault sensor device 100C in its operating state according to another embodiment of the present invention, and FIG. 8 is a block diagram showing the internal structure of the fault sensor device 100C of FIG. 7. This embodiment senses the phenomenon of discharging of a charge that is accumulated by electrification when an insulating oil makes frictional contact with a solid insulator in a forced oil transformer. Shown in FIG. 7 are an internal insulation 1C of the forced oil transformer that is to be monitored, parts of the microwaves 2a and 2b which are radiated when the charge accumulated in the internal insulation 1C is discharged from any position and which are then fed to the fault sensor device, 2a being a direct wave, and 2b being a reflected wave. 31A denotes a cooler for cooling the oil, and 32A denotes an oil pump. 6 to 9 are identical to those in embodiment 2, and their explanation is omitted here. In FIG. 8, 3B is a receiver made up of the antenna 3a and the bandpass filter 3b, 10A is a lock circuit connected between the output of the receiver 3B and the ground, and 12 denotes a superheterodyne type amplifier arranged between the output side of the receiver 3B and the input side of the detector 4. The detector 4 is almost equivalent to that in embodiment 1 except that, for example, it is for an intermediate frequency wave. The signal processor 5 is almost equivalent to that in embodiment 1, except that frequency instead of duration is measured.

The operation will now be discussed. When the charge accumulated in the internal insulation 1C is discharged, the microwaves 2a and 2b are radiated, received by the antenna 3a in the receiver 3B (2S1 in FIG. 8), output by the bandpass filter 3b as a microwave signal of a bandwidth appropriate for the subsequent amplifier 12 (2S2 in FIG. 8), amplified by the amplifier 12 (2S20 in FIG. 8), fed to the detector 4 to be converted into a video signal there (2S21 in FIG. 8), and fed to the signal processor 5. The signal processor 5 compares the magnitude and the frequency of the video signal input from the detector 4 with the predetermined set values and outputs an alarm signal and as well as a presentation signal. Although in the course of a tap changing operation in the tap changer 34A, part of the microwave 8 reaches the receiver 3B, the lock circuit 10 causes the output of the receiver 3B to be grounded to disable the amplifier 12 and subsequent stages.

As described above, this embodiment enjoys the same advantages as the embodiments 1 to 3, and since the receiver 3B is made up of the antenna 3a and the bandpass filter 3b, the structure of the receiver 3B becomes simplified and its fabrication step is easy, to provide an inexpensive and compact construction. Since the amplifier 12 amplifies the signal before being detected by the detector 4, subtle signal changes are sensed, and easily processed by the signal processor 5. Since the lock circuit 100A is provided to disable the issue of the alarm signal for a predetermined duration from the start of the operation of the tap changer 34A, erroneous sensing is prevented in the same way as in embodiments 2 and 3.

In this embodiment, the present invention is applied to monitoring a static discharge in a forced oil transformer, but the present invention is not limited to this, and may be applied to monitoring static discharge in a semiconductor device production line or static discharge in a vacuum drier apparatus.

Embodiment 5

Figure 9:
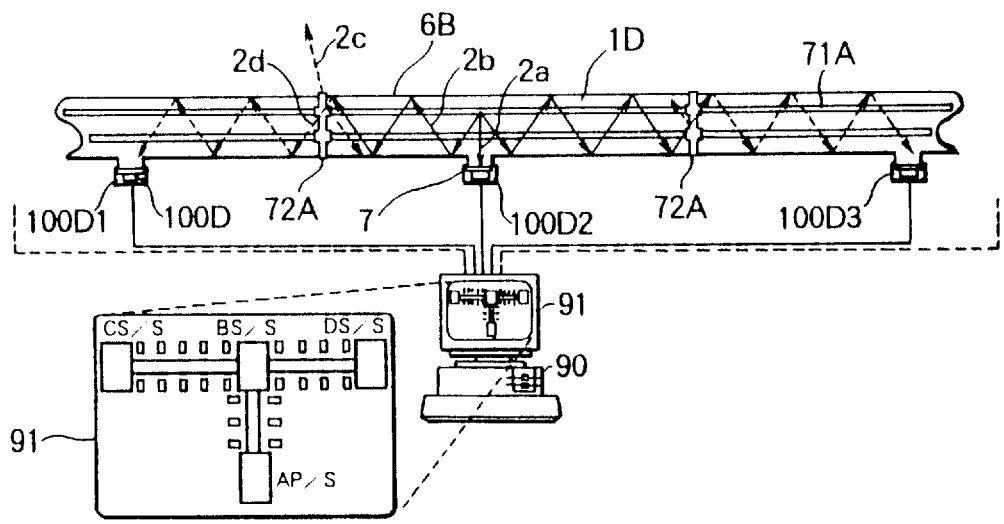
FIG. 9 is a general constructional view showing the fault sensor device in its operating state according to embodiment 5.
Figure 10:
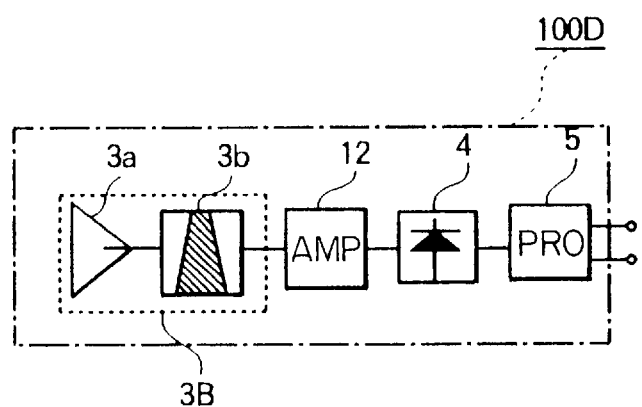
FIG. 10 is a block diagram showing the internal structure of the fault sensor device of FIG. 9.

FIG. 9 is a general constructional view showing the fault sensor device 100D (100D1, 100D2, 100D3) in its operating state according to another embodiment of the present invention and FIG. 10 is a block diagram showing the internal structure of the fault sensor device 100D of FIG. 9. In FIG. 9, three fault sensor devices are drawn, and are referred to as fault sensor devices 100D1, 100D2, 100D3 to distinguish therebetween. In FIG. 9, 1D denotes a gas insulated line (GIL) that is to be monitored, and 6B denotes a container made of metal for the gas insulated line 1D. 72A denotes insulating spacers which divide the interior of the container 6 into a plurality of partitions. 2a, 2b, 2c and 2d denote microwaves, 2a, direct waves, 2b, reflected waves, 2c, outgoing waves that leak out depending on the incident position or angle to the insulating spacer 72A, and 2d, transmission waves that are transmitted through the insulating spacer 72A of a dielectric material and ingresses into a neighboring partition.

As shown in FIG. 9, a fault sensor device 100D (namely, 100D1 to 100D3) of the present invention is mounted in each partition of the gas insulated line 1D, and the internal structure of 100D is arranged as shown in FIG. 10, which is identical to the fault sensor device in the embodiment 4 in FIG. 8 except for the lock circuit 10A. Embodiment 4 may be referred to for an explanation of each component. The signals from the fault sensors 100D are collected at one point, and then, for example, connected to a presentation unit 91 such as a display.

The operation will now be discussed. The operation of each fault sensor device 100D is identical to that of embodiment 4, except for the operation of the lock circuit 10. In FIG. 9, microwaves are radiated from fault such as a discharge that develops from poor internal insulation of the gas insulated line 1D or the like, parts of the microwaves, as the direct waves 2a or the reflected waves 2b, are fed to the fault sensor device 100D2 that is within the faulty partition, and another part propagates and reaches the insulating spacer 72A of the partition boundary while repeating reflections off the inner wall of the container 6B of the gas insulated line 1D or inner conductors 71A.

Figure 11:
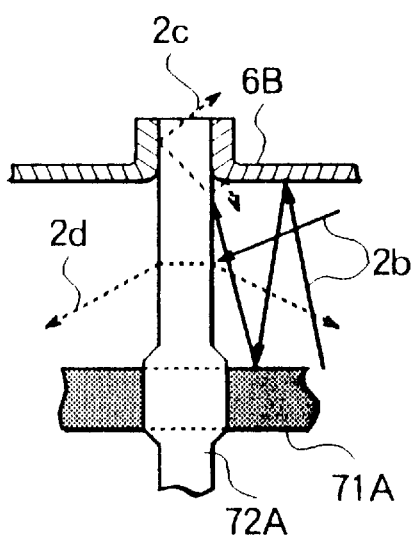
FIG. 11 is a partially enlarged cross-sectional view showing the insulating spacer of FIG. 9.

FIG. 11 shows the propagation of the microwaves 2b after reaching the insulating spacer 72A. Although part of the microwaves 2b reaching the insulating spacer 72A is reflected off the insulating spacer surface, remained part 2d is transmitted through the insulating spacer 72A that is a dielectric and propagates into the neighboring partition. Part of the microwaves 2b leaks out as outgoing waves 2c, depending on the incident position and angle to the insulating spacer 72A. The transmission wave 2d transmitted into the neighboring partition again repeats reflection within that partition of the container 6, and then fed to the fault sensor devices 100D1 or 100D3 at the neighboring partition.

Figure 12:
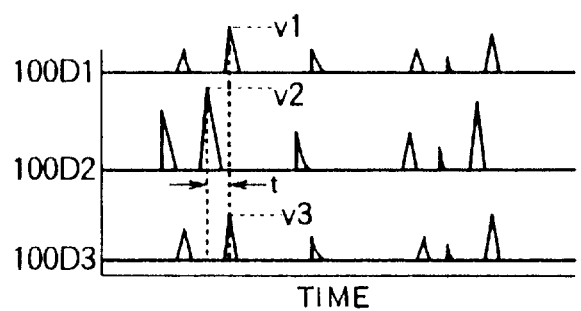
FIG. 12 is a graph showing the output of the detector of each fault sensor device in FIG. 9.

Depending on partial reflection and leaks at the insulating spacer 72A, as shown in FIG. 12, compared with a detection output v2 from the fault sensor device 100D2 mounted on the originating partition, detection outputs v1 and v3 from the fault sensor devices 100D1 and 100D3 mounted on the neighboring partitions are small. By displaying the signals from the fault sensor devices 100D on the presentation unit 91, the creation of the fault and the originating partition can be easily identified.

Embodiment 6

Figure 13:
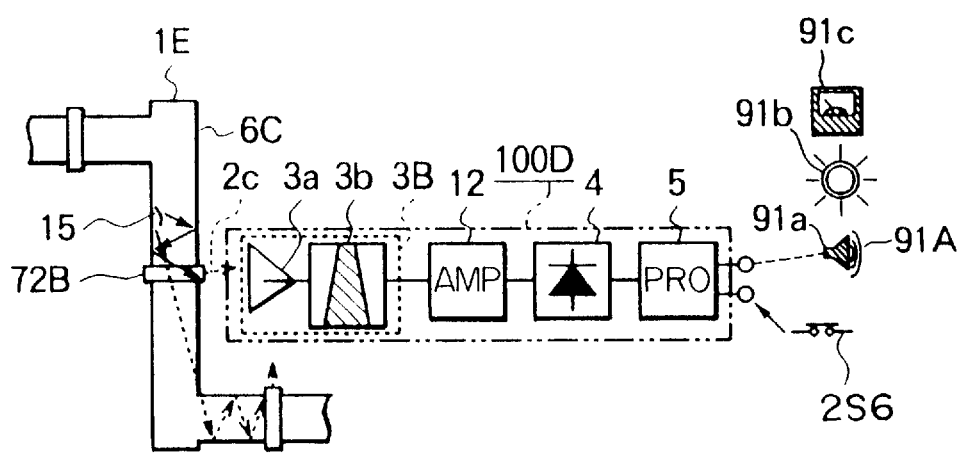
FIG. 13 is a general constructional view showing the fault sensor device in its operating state according to embodiment 6.

This embodiment is another application example of the fault sensor device 100D of embodiment 5. FIG. 13 shows generally the fault sensor device 100D of this embodiment in its operating state. Shown in the figure are a gas insulated switchgear 1E, a container 6C for the gas insulated switchgear 1E, and foreign matter 15 that slipped into the container 6C, such as wire debris. In this embodiment, the presence of the foreign matter 15 that slipped into the container 6C is sensed. 2c is an outgoing wave which is a leaked out part of the microwave radiated from a corona discharge of the foreign matter 15, and 72B are insulating spacers mounted at the boundary of the container 6 for dividing the container 6 into a plurality of partitions, and in this embodiment, the insulating spacer 72B is used as an aperture. The fault sensor device 100D in this embodiment remains identical to that in embodiment 5, and its explanation is omitted here. After the fault sensor device 100D is a presentation device 91A constructed of a loudspeaker 91a, a light 91b, a meter 91c or the like.

The operation will now be discussed. The foreign matter 15 that slipped into the container 6C floats and then falls repeatedly depending on the powerful internal electric field generated during the operation of the gas insulation switchgear 1E, and in this course, a corona discharge takes place at the edge of the foreign matter 15, microwaves are radiated from the discharge, and part of this leaks out through the periphery face of the insulating spacer 72B. In this embodiment, the fault sensor device 100D is designed to sense the outgoing propagation wave 2c. The operation of the fault sensor device 100D remains identical to that of the embodiment 4, except for the operation of the lock circuit 10A, and the output is provided in a form appropriate to the type of the following presentation device 91A.

When the fault sensor device 100D is mounted at a place other than the insulating spacer 72B or mounted on the insulating spacer 72B of the container 6c which includes no foreign matter 15, the level at reception is lowered, no alarm signal is issued, and the output at the presentation device 91A subsequent to the fault sensor device 100D is lowered.

The fault sensor device 100D in this embodiment operates as described above, and by watching the output on the presentation device 91A for the presence or absence of the alarm signal while following a simple operation in which the fault sensor device 100D is placed so that the output of the fault sensor device is maximized, a location where the microwave 2c leaks out is identified, and thus the container 6C suspected of containing foreign matter 15 can be identified.

Since a single antenna is used to receive the microwaves, the dimensions of the fault sensor device 100D are reduced, and mounting and handling the device is easy and the device is handy for carrying. The use of a narrow bandwidth and band which is not used for broadcasting etc. lowers noise level and prevents erroneous determinations.

In this embodiment, as described above, the fault to be monitored is a corona discharge that is generated by the foreign matter 15 in the gas insulation switchgear 1E when it is operated, and a small discharge is likely to be generated continuously if a fault takes place in electrical equipment during operation, the microwave is radiated from this discharge, and the fault sensor device of this embodiment is widely applied to detecting these faulty areas. For example, the present invention may be applied to identify contaminated or broken insulators, or to check a poorly insulated shield cable by a microwave that arrives at the end of the cable.

Embodiment 7

Figure 14:
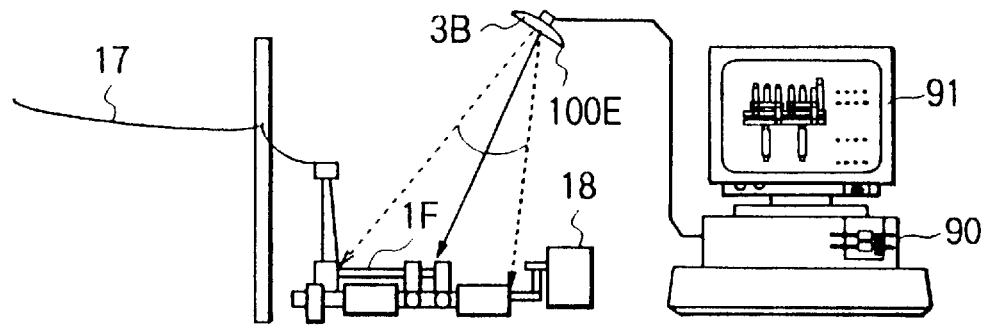
FIG. 14 is a general constructional view showing the fault sensor device in its operating state according to embodiment 7.
Figure 15:
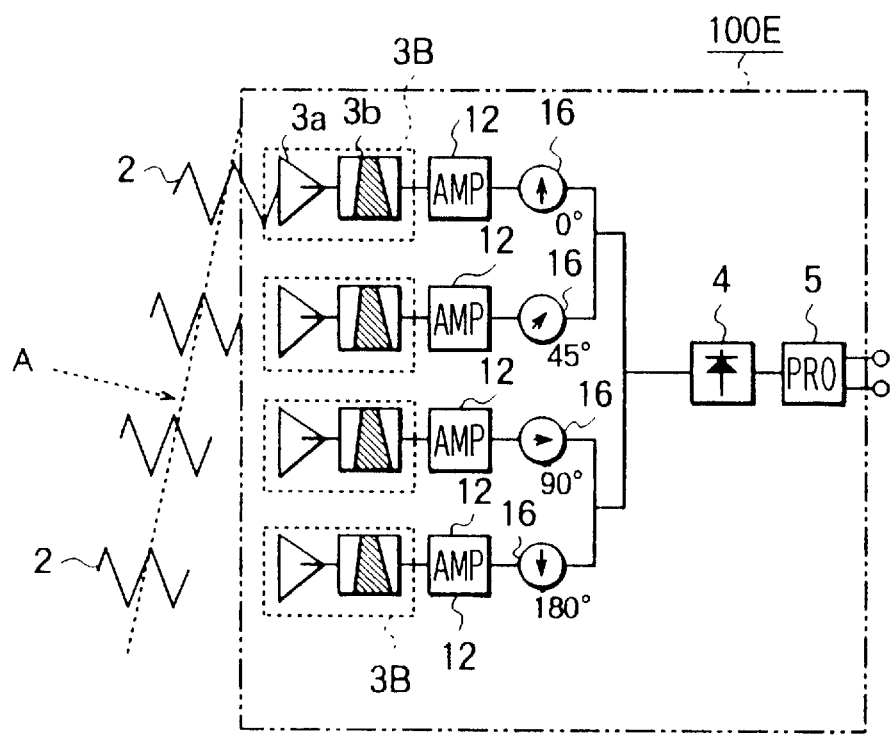
FIG. 15 is a block diagram showing the internal structure of the fault sensor device of FIG. 14.
Figure 16:
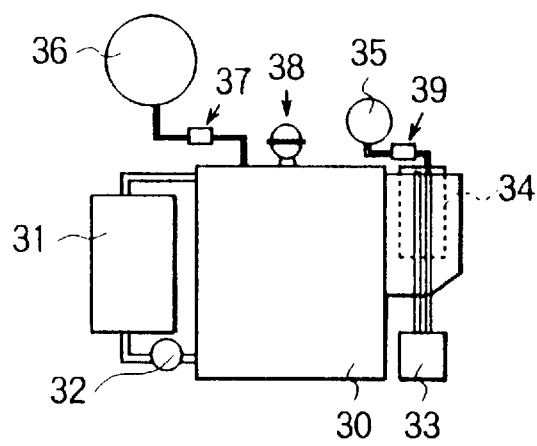
FIG. 16 is a block diagram showing a known oil-filled transformer protective relay.
Figure 17:
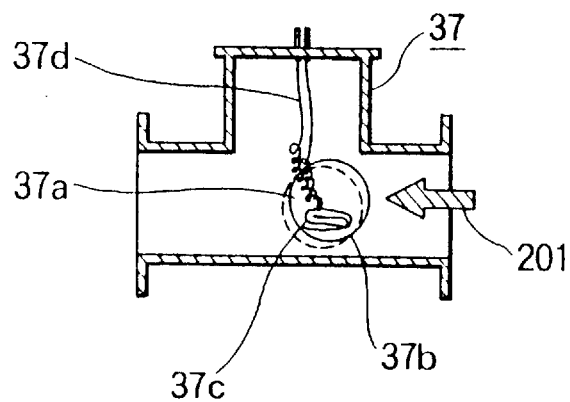
FIG. 17 is a cross-sectional view showing the construction of the Buchholtz's relay of FIG. 16.
Figure 18:
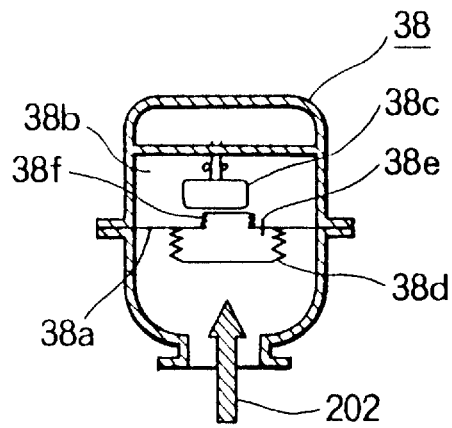
FIG. 18 is a cross-sectional view showing the sudden pressure relay of FIG. 16.
Figure 19:
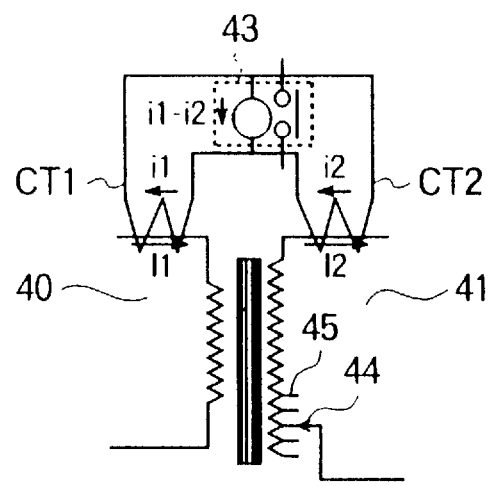
FIG. 19 is a block diagram showing the known differential relay (electrical) for protecting the transformer.
Figure 20:
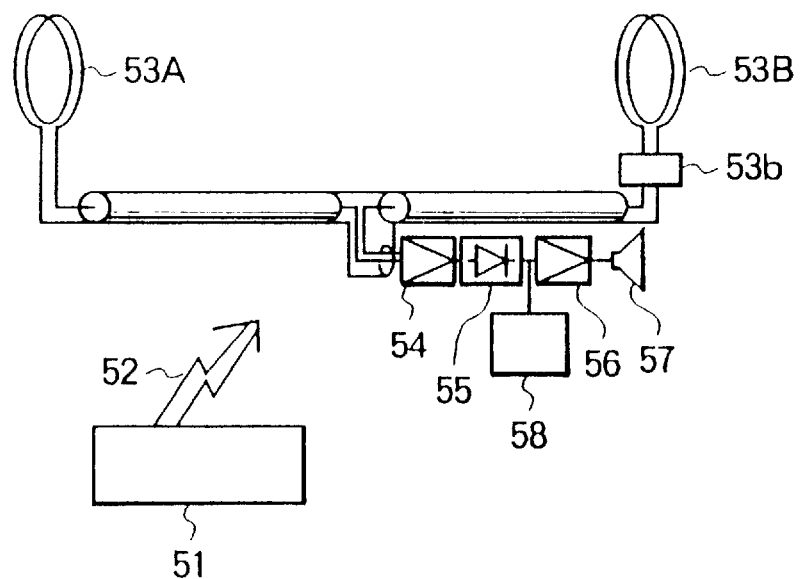
FIG. 20 is a block diagram showing the known internal fault sensor device in the electrical equipment.
Figure 21:
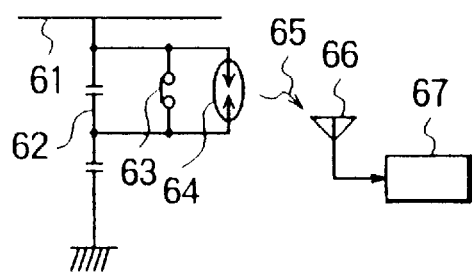
FIG. 21 is a schematic diagram showing the known fault monitoring device for the electrical equipment.
Figure 22:
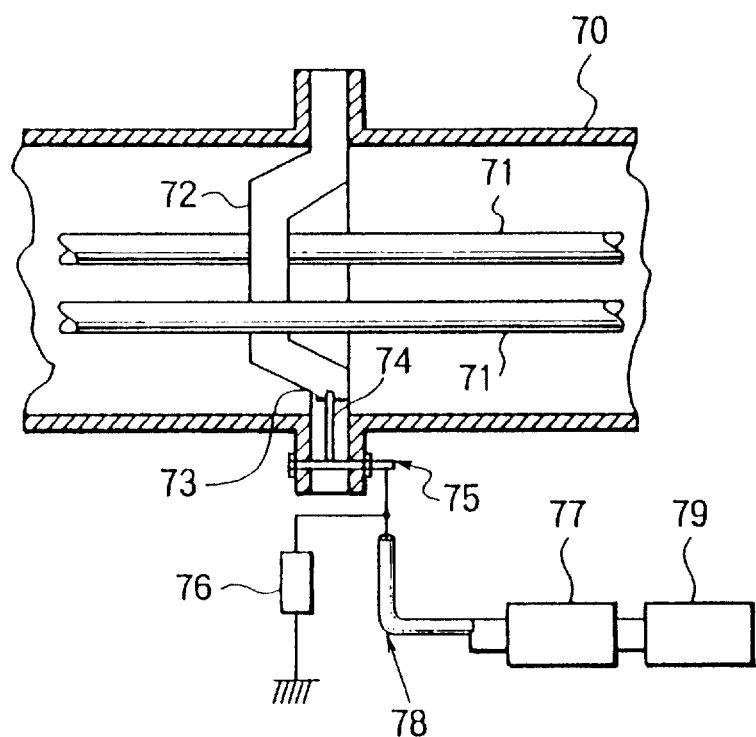
FIG. 22 is a cross-sectional view showing the known fault sensor device for a gas insulated switchgear.

FIG. 14 is a general constructional view showing the fault sensor device 100E in its operating state according to another embodiment of the present invention, and FIG. 15 is a block diagram showing the internal structure of the fault sensor device 100E of FIG. 14. As shown in FIG. 14, in this embodiment, the fault sensor device 100E is mounted in a place where generally can be overviewed gas insulated substation. In this embodiment, a narrow receiving beam antenna, for example, a parabola antenna is used as a receiver 3B, and the fault sensor device 100E is mounted on a rotary mechanism for scanning operations. To achieve a narrow beam width and scanning capability, the internal structure of the fault sensor device 100E may be of a so-called phased-array type as shown in FIG. 15. In FIG. 15, 16 denotes a phase shifter (phase-adjusting means) which adjusts by shifting the phase of the output signal with respect to the phase of the input signal so that a predetermined angle difference therebetween occurs. The broken line A in FIG. 15 denotes the direction of reception. In connection to the rest of the construction, components equivalent to those in the preceding embodiments are designated with the same reference numerals, so their explanation is omitted here. In the phased-array type sensor, as shown in FIG. 15, a plurality of receivers 3B are provided, components of the microwaves received by each receiver 3B, other than a fixed frequency band, are filtered out, amplified by an amplifier 12, phase-adjusted by the phase shifter 16 for each of the phases of the input signal so that a predetermined angle difference takes place, and fed to a common single detector 4. Connected subsequent to the fault sensor device 100E is, for example, a presentation device 91 such as a display. In FIG. 14, 1F denotes a gas insulation switchgear, 17 is a transmission line, and 18 denotes a transformer.

The operation will now be discussed. When a fault such as a miniature continuous discharge takes place in equipment in the gas substation, a microwave 2 is continuously radiated from the discharge, part of the microwave 2 leaks out through the insulating spacer 72B (refer to FIG. 13) at the junction of the gas insulation container in the same way as described with reference to the embodiment 6, and becomes an outgoing propagation wave 2c (refer to FIG. 6). The outgoing propagation wave 2c is received by the fault sensor device 100E when the receiving beam of the fault sensor device 100E scans the insulating spacer 72B, and the output signal of the fault sensor device 100E is displayed on screen on the presentation device 91 at a position corresponding to the direction of the receiving beam in the overview of the substation.

As described above, since the receiving beam width of the antenna 3a of the fault sensor device 100E is narrowed and made to scan, a small number of fault sensor devices are capable of monitoring for outgoing propagation waves 2c due to internal faults of any insulating spacer on a spacer by spacer basis even if many insulating spacers are used in a complicated structure such as in a gas insulated substation. In this embodiment, although the present invention is applied to a gas insulated substation, the same arrangement may be equally applied to air insulated electrical plant.

As described above with reference to the embodiments 1 to 7, taking advantage of the characteristics of the microwave, namely, the characteristic that the microwave is totally reflected off the surface of a metal material but travels straight in a vacuum or a uniform dielectric material for long far distances, the fault sensor device of the present invention can remotely receive microwaves that are radiated when an object to be monitored is operated or at fault, or microwaves that are radiated from a natural phenomenon, to output a predetermined signal. Thus, information required for treating the object to be monitored may be obtained at a low noise level.

In this way, according to the present invention, there is provided a fault sensor device which is compact, easy to operate and free from erroneous sensing, which detects an internal fault in a correct and fast manner, and which operates to respond to internal faults before the fault area spreads.

I claim:

1. A fault sensor device comprising receiver means for receiving microwaves radiated from an object to be monitored;

detector means connected to said receiver means for converting components of the microwaves into a video signal; and signal processor means for converting the video signal output by said detector means into a presentation signal and outputting the presentation signal to an external presentation device, and for determining whether or not the microwaves radiated are associated with a fault, based on one of the duration and the frequency of the video signal and the level of the video signal, and for issuing an alarm signal when the determination reveals that the microwaves are associated with the fault.

2. The fault sensor device according to claim 1, wherein said receiver means comprises:

an antenna for receiving the microwaves;

a bandpass filter connected to said antenna for picking up and outputting components of a predetermined frequency band from the microwaves; and a limiter connected to said bandpass filter for limiting the components of the predetermined frequency band to a predetermined level and outputting the limited components to the detector means.

3. The fault sensor device according to claim 1, wherein said receiver means comprises:

an antenna for receiving the microwave;

a bandpass filter connected to said antenna for picking up and outputting components of a predetermined frequency band from the microwaves, and an attenuator connected to said bandpass filter for attenuating the components of the predetermined frequency band below a predetermined level without altering the variation of the components of the predetermined frequency band over time and outputting the attenuated components to the detector means.

4. The fault sensor device according to claim 1, wherein said receiver means comprises:

an antenna for receiving the microwaves; and a bandpass filter connected to said antenna for picking up and outputting the components of a predetermined frequency band from the microwaves.

5. The fault sensor device according to claim 1, wherein the object to be monitored radiates microwaves when the object is at a predetermined step in normal operation or is at fault, said predetermined step being initiated by an external start signal, and said fault sensor device further comprises a first lock means connected to said signal processor means for disabling the output of the alarm signal from the signal processor means for a predetermined period of time from the moment the start signal is entered.

6. The fault sensor device according to claim 1 further comprising memory means connected to said signal processor means for storing the process results of the signal processor means.

7. The fault sensor device according to claim 1 further comprising amplifier means connected between the receiver means and the detector means for amplifying the components of the microwave received from the receiver means.

8. The fault sensor device according to claim 1, wherein the object to be monitored radiates the microwaves when the object is at a predetermined step in normal operation or is at fault, said predetermined step being initiated by an external start signal; and said fault sensor device further comprising a second lock means connected between the output side of said receiver means and a ground terminal for grounding the signal output by said receiver means to prohibit the signal by the receiver means from entering said detector means for a predetermined period of time from the moment the start signal is entered.

9. The fault sensor device according to claim 1, wherein said receiver means is mounted a predetermined distance apart from the object to be monitored, and said receiver means receives the microwave that is radiated from the object to be monitored and arrives after being transmitted through the atmosphere.

10. The fault sensor device according to claim 9, wherein a plurality of said receiver means are provided, and said receiver means are shifted to scan the object to be monitored.

11. The fault sensor device according to claim 10 further comprising phase-adjusting means connected between said plurality of receiver means and said detector means for shifting the phase of the microwaves from the receiver means by a predetermined angle and for outputting the phase shifted signal.

12. The fault sensor device according to claim 1, wherein the object to be monitored has a shield covering for shielding the object from external electromagnetic waves, a window being formed in the shield covering to allow microwaves to be transmitted therethrough, with said receiver means being mounted on the window, said receiver means receiving the microwaves generated within the shield covering.

13. The fault sensor device according to claim 1, wherein the object to be monitored has a shield covering for shielding the object from external electromagnetic waves, partitioning means through which the microwave is transmitted being provided in the shield covering, the partitioning means dividing the interior of the shield covering into a plurality of partitions, a window through which the microwaves are transmitted being provided in each of the partitions in the shield covering, with said receiver means being provided on each of the windows, whereby the microwaves generated in a partition in the shield covering are received by said receiver means mounted on the corresponding partition and the microwaves coming into a neighboring partition next to the partition after being transmitted through the partitioning means are received by said receiver means mounted on the neighboring partition.

14. A fault sensing method comprising:

a receiving step of receiving the microwaves radiated from an object to be monitored;

a detecting step of converting components of the microwaves into a video signal;

a presentation signal output step of converting the video signal into a presentation signal and outputting the presentation signal to an external presentation device; and an alarm signal generating step of determining whether or not the microwaves radiated are associated with a fault, based on one of the duration and the frequency of the video signal and the level of the video signal, and for issuing an alarm signal when the determination reveals that the microwaves are associated with the fault.

* * * * *